Aug. 9, 1960   H. BARTH ET AL   2,948,890
POSITION METER

Filed April 26, 1956   7 Sheets-Sheet 1

INVENTORS
HANS BARTH
CARL H. O'DELL
BY
Lippincott & Smith
ATTORNEYS

INVENTORS
HANS BARTH
CARL H. O'DELL
BY
Lippincott & Smith
ATTORNEYS

United States Patent Office 2,948,890
Patented Aug. 9, 1960

2,948,890
POSITION METER

Hans Barth, Palo Alto, and Carl H. Odell, Mountain View, Calif., assignors to O'Dell Brothers, Mountain View, Calif., a corporation of California Filed Apr. 26, 1956, Ser. No. 580,766

5 Claims. (Cl. 340—347)

This invention relates to apparatus for measuring changes in the position of a movable part, and in particular to apparatus for providing a continuous digital indication of the position.

There are many industrial and scientific applications for apparatus capable and continuously and precisely indicating the position of a movable part. In some instances, very simple apparatus such as a calibrated scale and an index marker suitable for visual observation may be adequate. In other instances, the requirements are more severe, and more elaborate position meters are needed. For example, permanent records or remote indications may be desired; the part may move too rapidly for direct observation; precise measurements may be needed of very small changes in position that cannot be made easily by direct observation; or electrical signals may be needed for control purposes. Accordingly, an object of this invention is to provide improved position meters for continuously measuring with great precision the instantaneous positions of a movable part, and for indicating or recording these positions, or providing electrical control signals, in convenient digital form at any desired nearby or remote location.

Various photoelectric positioning devices have previously been described that employ moving parts having areas of different light-transmitting or light-reflecting properties in combination with photoelectric transducers for converting light variations into electric signals. For example, a movable scale may have light or dark lines so arranged that different amounts of light reach a phototube in different positions of the scale, whereby electric pulses are provided as the scale is moved. However, difficulties arise when it becomes necessary to sense the direction of motion regardless of frequent speed or direction changes. Accordingly, another object of this invention is to provide an improved direction-sensitive position meter.

In previous photoelectric positioning apparatus, the resolving power of the apparatus (that is, the smallest change in position that can be measured) is limited by the spacing of lines on the movable scale. In other words, the closer the spacing, the greater the resolving power. But the minimum practicable spacing is limited by manufacturing considerations and also by optical defraction. Accordingly, another object of this invention is to provide photoelectric position meters having exceedingly great resolving power, capable of measuring changes in position in the order of or smaller than a single wavelength of light.

Other objects and advantages of the invention will appear as the description proceeds.

Briefly stated, in accordance with certain aspects of this invention, a movable ruled scale is incorporated in an optical system that includes a reticule and a phototube so arranged that different amounts of light reach the phototube at different positions of the scale, and the phototube provides an electric signal having instantaneous amplitudes that are a repeating function of the position of the scale. A second reticule and phototube is arranged to provide another electric signal having instantaneous amplitudes that are a repeating function of the position of the scale, and the two reticules are displaced in their positions relative to the scale ruling in such a way that the two electric signals are substantially in position quadrature.

"Position quadrature," as used in this specification, means that the two signals, when their amplitudes are plotted as a function of scale position, have the same relation to each other that two signals in phase quadrature have when their amplitudes are plotted as a function of time.

Consequently, when the scale is moved continuously in either direction, two electric signals substantially in phase quadrature are provided. When the scale is moved in one direction, a first one of these signals is in leading phase relation to the other one of the electric signals, but when the scale is moved in the opposite direction, the first signal is in lagging phase relation to the second signal. In other words, the phase relation of the two electric signals depends on the direction of motion of the scale.

The two electric signals provided by the two phototubes control a multistate electrical trigger circuit having three stable operating states. Transient conditions of insignificant duration, encountered briefly during switching from one state to another, can and generally will be ignored. As the scale moves in one direction, the trigger circuit is repetitively switched through the three states in a first sequence, and as the scale moves in the opposite direction the trigger circuit is repetitively switched through the three states in a second sequence. The second sequence is the reverse of the first sequence.

Responsive to the operation of the trigger circuit there are provided two sequences or pluralities of electric pulses: for example, a sequence or plurality of pulses through one wire and another sequence or plurality of pulses through another wire. For convenience, these two sequences will be referred to as a first pulse plurality and a second pulse plurality. An electric pulse of a first pulse plurality is produced each time that the trigger circuit passes directly from a first to a second of the three operating states, and a pulse of a second pulse plurality is provided each time that the trigger circuit passes directly from the second to the first of the three operating states. As here used "directly" means without passing through another stable state; transient conditions of insignificant duration are ignored. Thus motion of the scale in one direction provides electric pulses of the first plurality, while motion of the scale in the opposite direction provides electric pulses of the second plurality.

There is also provided pulse-counting means additively responsive to pulses of the first plurality and subtractively responsive to pulses of the second plurality. The pulse-counting means displays in convenient digital form numerical values representing instantaneous positions of the movable scale.

In preferred embodiments, the trigger circuit includes two discharge devices each having conductive and nonconductive selective operating conditions. The two devices are so interconnected that only one-at-a-time of the devices may be conductive. Consequently, either or neither, but not both, of the two discharge devices may be conductive to provide the three operating states of the trigger circuit.

For providing greater resolving power, the scale rulings may be in the form of cylindrical mirrors producing wedges of light focused on the reticules. The spacing of the reticule apertures may be several times smaller than the spacing of the scale ruling, and measurements may be made of position changes that are much smaller than the spacing of the rulings on the scale.

The invention will be better understood from the following detailed description taken in connection with the accompanying drawings, and its scope will be pointed out in the appended claims. In the drawings:

Figure 1:
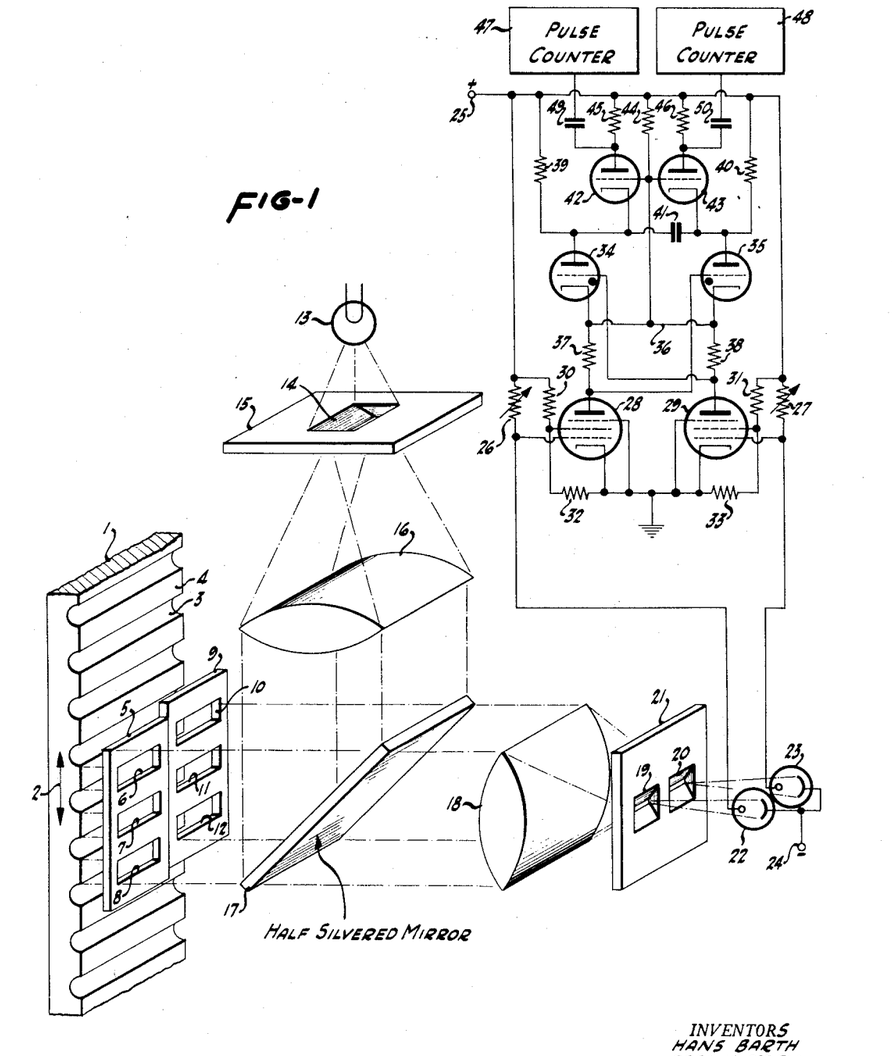
Fig. 1 is a schematic perspective view and circuit diagram illustrating one embodiment of the invention.

Referring now to Fig. 1 of the drawings, a scale 1 is movable up or down vertically, as is indicated by arrow 2. The scale may be attached to or a portion of any movable part the position of which is to be measured. In the embodiment illustrated, scale 1 moves along a straight line. Alternatively, the scale may be curved in shape and attached to a rotary part for measuring angular positions. The scale has a flat, optically reflecting surface containing a plurality of uniformly-spaced parallel ruled light-diffusing grooves 3 extending substantially perpendicular to its direction of motion and equally spaced along the direction of motion. Between the grooves there are a plurality of uniformly spaced, parallel, optically flat reflecting strips 4. For simplicity and clarity, rather large, widely spaced grooves have been illustrated. In actual practice, the grooves may be very fine, closely spaced lines ruled on a polished surface.

A recticule 5 has a plurality of uniformly spaced parallel slit-like optical apertures 6, 7 and 8, with the same spacing between the apertures as the spacing between the grooves of scale 1. Only three apertures are illustrated, but in actual practice a large number of very small, very closely spaced apertures may be employed. For example, the reticule may consist of small parallel wires or threads equally spaced to form a large number of small slit-like apertures, or the reticule may be an optical grating ruled on a flat sheet of glass or quartz. A similar reticule 9 has apertures 10, 11 and 12 that are displaced from apertures 6, 7 and 8 with respect to positional alinement with grooves 3 in a direction of motion of scale 1 by an amount substantially equal to one-quarter the spacing of grooves 3. In other words, from a position in which flat reflecting strips 4 are alined with apertures 6, 7 and 8 of reticule 5, upward movement of scale 1 by a distance substantially equal to one-fourth the spacing between the centers of adjacent grooves 3 brings strips 4 into alinement with apertures 10, 11 and 12 of reticule 9. Reticules 5 and 9 are coplanar, and are each adjacent and parallel to the reflecting surface of scale 1, with the reticule apertures substantially parallel to grooves 3. The two reticules may be side-by-side as shown, or they may be end-to-end, or they may be incorporated in completely separate optical systems.

A lamp 13 illuminates a slit or aperture 14 in an optical mask 15. Typical light rays are represented in the drawing by broken lines. Light from slit 14 is substantially collimated by a cylindrical lens 16 and is directed onto a beam-splitter having a semi-reflecting surface, such as half-silvered mirror 17, that reflects about half of the incident light and transmits the remainder without reflection. The reflected light forms a substantially collimated beam that illuminates reticules 5 and 9. Light passes through the apertures of the reticule to scale 1, thereby illuminating a portion of the scale including a plurality of reflecting strips 4.

When flat strips 4 are alined with a set of reticule apertures, a substantial amount of light is reflected back through the apertures to mirror 17. A portion of this light is transmitted through the mirror and is focused by a collecting lens 18 upon two slits 19 and 20 in an optical mask 21. Light reflected back through apertures 6, 7, and 8 of reticule 5 is focused on slit 19 and passes through this slit to the cathode of a phototube 22. Light reflected back through apertures 10, 11, and 12 of reticule 9 is focused on slit 20 and passes through this slit to the cathode of a phototube 23. Thus there are provided two light signals, substantially in position quadrature, having intensities that vary as repeating functions of the position of scale 1. Phototubes 22 and 23 are transducers for converting these light signals into two electric signals substantially in position quadrature.

Terminal 24, which is maintained at a negative potential (minus 45 volts, for example) by any suitable voltage supply means (not shown), is connected to the cathodes of both phototubes. Terminal 25, which is maintained at a positive potential (plus 200 volts, for example) by the voltage supply means, is connected to the anode of phototube 22 through an adjustable resistor 26, and is connected to the anode of phototube 23 through an adjustable resistor 27. As is well known, the electrical resistance of a phototube depends on the amount of light striking its cathode. Consequently, the anode potential of phototube 22 is a function of the amount of light reflected back through the apertures of reticule 5, and the anode potential of phototube 23 is a function of the amount of light reflected back through the apertures of reticule 9. The average values of the phototube anode potentials can be adjusted by adjusting resistors 26 and 27.

Two pentode vacuum tubes 28 and 29 have their cathodes and suppressor grids connected to ground or its circuit equivalent, as shown. The control grid of pentode 28 is connected to the anode of phototube 22, and the control grid of pentode 29 is connected to the anode of phototube 23. Terminal 25 is connected to the screen grid of pentode 28 through a resistor 30, and is connected to the screen grid of pentode 29 through a resistor 31. The two screen grids are connected to ground through resistors 32 and 33 having appropriate values to maintain the screen grids at proper operating potentials.

Two thyratrons 34 and 35 have their cathodes connected together by a lead 36, as shown. The anode of pentode 28 is connected to lead 36 through a resistor 37, and the anode of pentode 29 is connected to lead 36 through a resistor 38. The control grid of thyratron 34 is connected to the anode of pentode 29, and the control grid of thyratron 35 is connected to the anode of pentode 28. Terminal 25 is connected to the anode of thyratron 34 through a resistor 39, and is connected to the anode of thyratron 35 through a resistor 40. The anodes of the two thyratrons are connected together through a capacitor 41, as shown.

A triode vacuum tube 42 has its cathode connected to the anode of thyratron 34, and another triode vacuum tube 43 has its cathode connected to the anode of thyratron 35. The control grids of triodes 42 and 43 are connected to lead 36, and may be connected to terminal 25 through a resistor 44. Terminal 25 is connected to the anode of triode 42 through a resistor 45, and is connected to the anode of triode 43 through a resistor 46.

Pulse counters 47 and 48 may be any suitable devices for high-speed counting of electric pulses. Since many high-speed electronic pulse-counting circuits are known to those skilled in the art, the pulse counters will not be described in detail. Pulse counter 47 is connected to the anode of triode 42 through a coupling capacitor 49, and pulse counter 48 is connected to the anode of triode 43 through a coupling capacitor 50. As is hereinafter explained, a single differential pulse counter may be used in place of counters 47 and 48.

Figure 2:
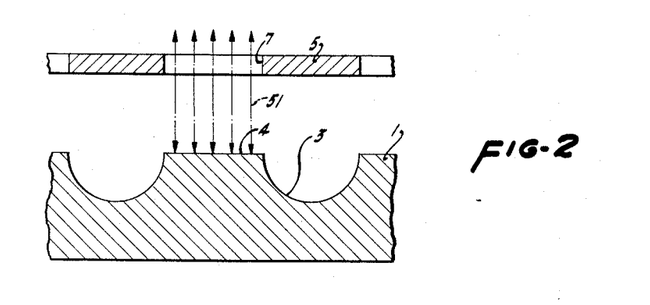
Fig. 2 is a schematic fragmentary detail section of the ruled scale and a reticule of the Fig. 1 embodiment.
Figure 3:
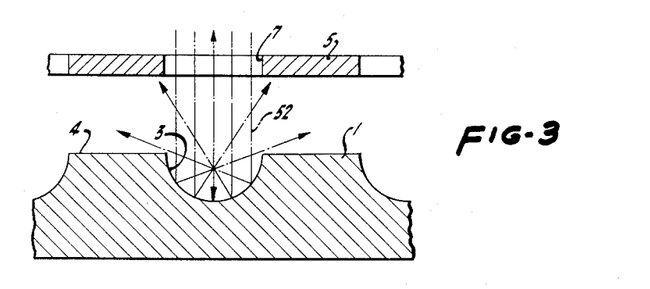
Fig. 3 is another schematic fragmentary detail section of the same ruled scale and reticule, showing the scale in a different position.

Reference is now made to Figs. 2 and 3, which are enlarged schematic fragmentary sections of scale 1 and reticule 5 showing two different positions of the scale. When flat portions 4 of the scale are alined with the apertures of the reticule, as is illustrated in Fig. 2, light rays passing through the reticule apertures are reflected back on themselves, as indicated by the double-headed broken arrows 51, and a maximum amount of light reaches phototube 22. When the ruled grooves 3 of the scale are alined with the apertures of the reticule, as illustrated in Fig. 3, light rays passing through the reticule apertures are scattered in a variety of directions by the grooves, as is represented by broken arrows 52, and much less light reaches phototube 22. Consequently, as scale 2 moves in either direction relative to reticule 5, the flat portions and the grooves of the scale alternately come into alinement with the reticule apertures, and the amount of light reaching phototube 22 alternately increases and decreases. In other words, reflecting strips 4 form parallel bands of reflected light that move with the scale as scale 1 moves, and reticule 5 transmits more or less of the reflected light depending upon the scale position.

The same thing happens in the case of reticule 9, but because the apertures of reticule 9 are displaced from the apertures of reticule 5 in a direction of scale motion, the scale positions at which maximum light reaches phototube 23 are different from the scale positions at which maximum light reaches phototube 22. Consequently, the two reticules provide two reflected light signals, that are substantially in position quadrature with respect to displacements of scale 1.

Figure 4:
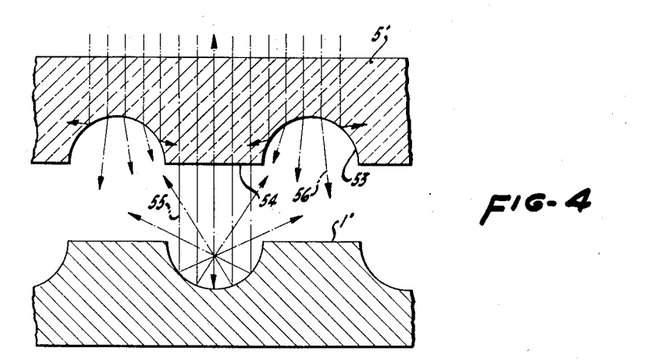
Fig. 4 is a schematic fragmentary detail section of a ruled scale and reticule, showing an alternative reticule construction.

An alternative reticule construction is illustrated in Fig. 4. Referring now to Fig. 4, the scale 1' may be identical to the scale 1 hereinbefore described. Reticule 5' is a transparent plate, made of glass or quartz for example, having a plurality of parallel ruled grooves 53 separated by optically flat surfaces 54. Light rays normal to flat surfaces 54 pass straight through the reticule without substantial refraction, as is indicated by broken arrows 55, but light rays are refracted by grooves 53 and scattered in a variety of directions, as is indicated in the drawing by broken arrows 56. When flat portions of the scale are alined with flat portions 54 of the reticule, a substantial number of the light rays are reflected back upon themselves, and a maximum amount of light reaches phototube 22. On the other hand when the grooves of the scale are alined with flat portions 54 of the reticule, most all of the light is scattered by the grooves in the reticule and the grooves in the scale, and much less light reaches phototube 22.

Figure 5:
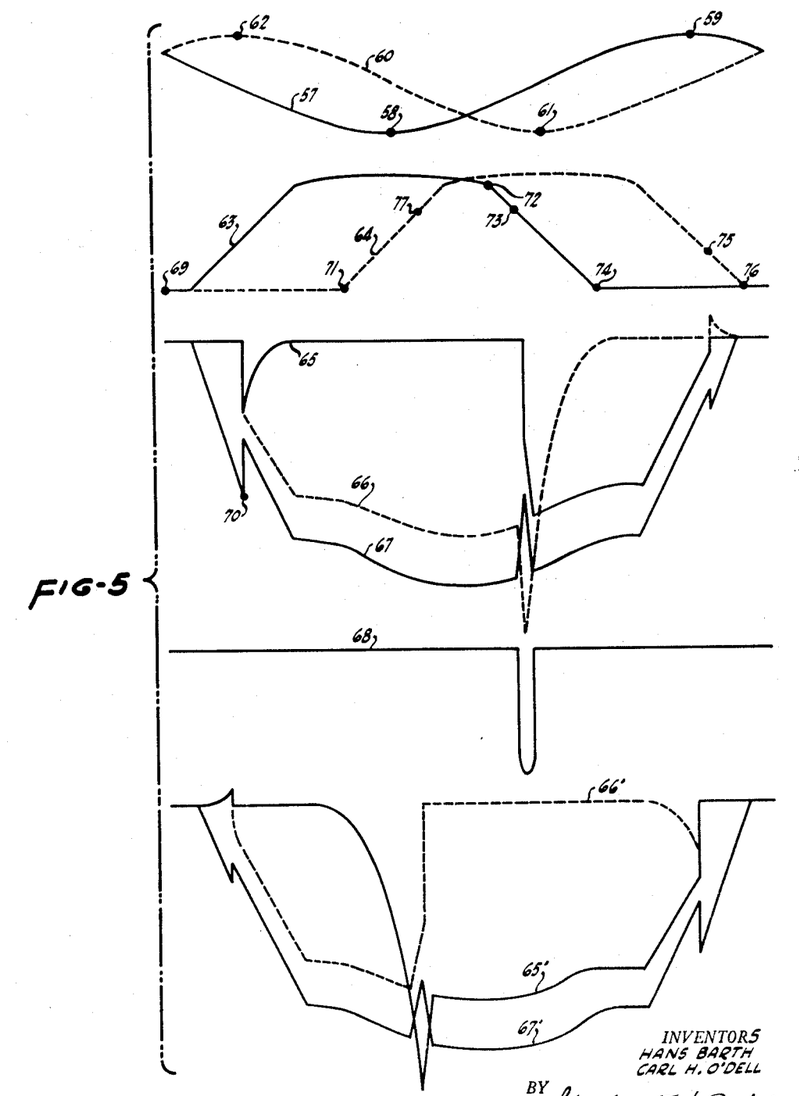
Fig. 5 is a group of curves that will be used in explaining operation of the apparatus illustrated in Fig. 1.

Operation of the electrical circuit shown in Fig. 1 can best be understood by reference to the curves shown in Fig. 5. Solid curve 57 represents the amount of light reaching phototube 22 as scale 1 is moved through a distance equal to the spacing between ruled grooves 3. At point 58 grooves 3 are alined with the apertures of reticule 5 and the minimum amount of light reaches phototube 22. At point 59, flat portions 4 of the scale are alined with the apertures of reticule 5, and the maximum amount of light reaches phototube 22.

Broken curve 60 represents the amount of light reaching phototube 23. At point 61 the grooves 3 of scale 1 are alined with the apertures of reticule 9 and the minimum amount of light reaches phototube 23, and at point 62 the flat portions 4 of scale 1 are alined with the apertures of reticule 9 and the maximum amount of light reaches phototube 23.

When scale 1 is moved by a greater distance, curves 57 and 60 repeat, there being one complete cycle of each curve for each incremental movement of the scale equal to the spacing of the grooves 3. When the scale is moved continuously in one direction, curve 60 lags curve 57 in time by approximately one-quarter cycle, and when the scale is moved to the other direction, curve 60 leads curves 57 in time by approximately one-quarter cycle. In other words, curves 57 and 60 have instantaneous amplitudes that are repeating functions of the position of the scale, and the two curves are substantially in position quadrature.

The electrical resistance of the phototube 22 is an inverse function of the amount of light reaching its cathode. As the resistance of phototube 22 increases, the control grid potential of pentode 28 increases; and as the resistance of phototube 22 decreases, the control grid potential of pentode 28 decreases. The most negative portions of the control grid potential drive pentode 28 beyond cutoff, and the most positive portions of the control grid potential are limited by the flow of grid current through resistor 26. Consequently, the effective electric signal applied to the control grid of pentode 28, which determines the electrical conductivity of this tube, is represented by solid curve 63. Similarly, the effective electric signal supplied to the control grid of pentode 29 is represented by broken curve 64. It will be noted that curves 63 and 64 represent substantially rectangular or trapezoidal waves that overlap each other to a certain extent. If desired, amplifiers may be provided in the circuits between phototubes 22 and 23 and pentodes 28 and 29 for additional amplification and limiting of the electric signals to provide more nearly rectangular waveforms.

Curves 63 and 64 are position functions which represent the respective amplitudes of electric signals supplied to the control grids of pentodes 28 and 29 at various positions of scale 1. If the scale is moved continuously in one direction, the position of the scale is a function of time, and curves 63 and 64 become time functions. For example, when scale 1 is moved continuously upward the curves of Fig. 5 represent time functions in which positive increments of time are represented by the left-to-right horizontal direction, and when scale 1 is moved continuously downward positive increments of time are represented by the right-to-left horizontal direction in Fig. 5.

Assume, for example, that scale 1 is moved upward continuously, and that positive increments of time are represented by the left-to-right horizontal direction in Fig. 5. In other words, the beginning of an operating cycle is represented by the left-hand ends of the curves, and the end of an operating cycle is represented by the right-hand ends of the curves. Under these conditions, solid curve 65 represents the anode potential of thyratron 35, broken curve 66 represents the anode potential of thyratron 34, solid curve 67 represents the potential of lead 36, and solid curve 68 represents the anode potential of triode 42.

At the beginning of an operating cycle, represented by point 69, both of the pentodes 28 and 29 are cut off or made non-conductive by the negative potentials supplied to their control grids. Since the pentodes are in series with the other tubes, thyratrons 34 and 35 and triodes 42 and 43 are likewise cut off, since the pentodes prevent the flow of any current through the circuit except the current through phototubes 22 and 23 and their load resistors 26 and 27. Consequently, the anode potentials of the two thyratrons and the two triodes, and the potential of lead 36, are substantially equal to the positive potential of terminal 25.

As scale 1 moves upward, the amount of light reaching phototube 22 decreases, and the control grid potential of pentode 28 increases. Consequently, pentode 28 begins to conduct current, and the potental of lead 36 decreases until, at point 70, there is sufficient voltage across thyratron 34 for this thyratron to fire or become conductive. The current flowing through resistor 37 applies a negative bias to the control grid of thyratron 35 that prevents thyratron 35 from firing at this time. When thyratron 34 fires, its anode potential drops sharply, and capacitor 41 causes a corresponding drop in the anode potential of thyratron 35. However, since thyratron 35 is non-conductive, capacitor 41 quickly charges through resistor 40 and the anode potential of thyratron 35 returns substantially to the positive potential of terminal 25, as is shown by curve 65. As scale 1 continues to move upward, less light reaches phototube 22, and more current flows through resistor 39, thyratron 34, resistor 37, and pentode 28. The voltage drop across resistor 37 keeps thyratron 35 cut off, and the voltage drop across thyratron 34 keeps triodes 42 and 43 cut off.

At point 71 pentode 29 begins to conduct current. This current flows through resistor 39, thyratron 34, and resistor 38. Thyratron 35 is still kept in the non-conductive condition by the voltage drop across resistor 37. The voltage drop across resistor 38 applies a negative bias to the control electrode of thyratron 34, but this negative bias has no appreciable effect upon the thyratron that is already conducting current. Because of the additional current due to conduction by both pentodes, there is still a further drop in the anode potential of thyratron 34 and the potential of lead 36.

At point 72 pentode 28 begins to conduct less current, and the voltage drop across resistor 37 decreases. At point 73 the voltage drop across resistor 37 has become sufficiently small that thyratron 35 can fire. When thyratron 35 fires, several things happen so rapidly that the transition times are insignificantly small, and the events to be described can be considered simultaneous. The anode potential of thyratron 35 drops suddenly, as is indicated by the steep almost vertical portion of curve 65. Momentarily, while both thyratrons are conductive to the transient currents encountered during switching, there is a current surge that produces a positive peak in the potential of lead 36, as may be seen in curve 67. Furthermore, the rapid drop in the anode potential of thyratron 35 is transmitted to the anode of thyratron 34 through capacitor 41, as may be seen in curve 66, so that momentarily there is a reverse voltage across thyratron 34 that interrupts the flow of current through this thyratron. As soon as the flow of current has been interrupted, the gas in thyratron 34 begins to de-ionize and thyratron 34 is cut off by the negative bias applied to its control grid by the voltage drop across resistor 38.

Furthermore, there is a sudden drop in potential at the cathode of triode 42, which is connected to the anode of thyratron 34, and a sudden rise in potential at the control grid of triode 42, which is connected to lead 36, so that triode 42 becomes conductive momentarily to provide a negative pulse at its anode. This pulse, shown in curve 68, is transmitted through capacitor 49 to pulse counter 47. Because the charge of capacitor 41 maintains the cathode of triode 43 at a more positive potential than the cathode of triode 42, triode 43 does not become conductive and no pulse is supplied to pulse counter 48 at this time. The current pulse conducted by triode 42 discharges capacitor 41, and since thyratron 34 is now cut off, capacitor 41 recharges with the opposite polarity, and the anode potential of thyratron 34 approaches the positive potential of terminal 25.

At point 74 pentode 28 is cut off, but current continues to flow through resistor 40, thyratron 35, resistor 38, and pentode 29. At point 75 the amount of current flowing through pentode 29 becomes insufficient to maintain conduction in thyratron 35, and thyratron 35 is cut off. At point 76 both of the pentodes are cut off, and the circuit has returned to its initial condition with no current flow in any part of the circuit except phototubes 22 and 23 and their load resistors 26 and 27.

If scale 1 continues to move upward, the same cycle of operation is repeated again and again, and a pulse is supplied to pulse counter 47 for each increment of upward movement of the scale equal to the spacing of grooves 3. Pulse counter 47 displays the total number of pulses received by it, and thus displays in convenient digital form a numerical indication proportional to the amount of upward movement of scale 1.

If scale 1 moves downward, a similar cycle of operation occurs except that the potentials in the left-hand and right-hand portions of the electrical circuit are interchanged, and electric pulses are supplied to pulse counter 48. For example, assume that a cycle of operation starts at point 76 and ends at point 69 of curves 63 and 64. Now solid curve 65' represents the anode potential of thyratron 35, broken curve 66' represents the anode potential of thyratron 34, and solid curve 67' represents the potential of lead 36. Proceeding from right to left in the curves of Fig. 5, pentode 29 begins to conduct before pentode 28, and thyratron 35 fires while thyratron 34 is cut off by the voltage drop across resistor 38. Thyratron 34 does not fire until point 77 is reached, at which point the voltage drop across resistor 38 has become too small to keep thyratron 34 cut off. As soon as thyratron 34 fires, its anode potential drops suddenly, and this sudden drop is transmited through capacitor 41 to the anode of thyratron 35, thereby cutting off this thyratron. Triode 43 becomes conductive momentarily, while triode 42 remains cut off, and a negative pulse is supplied through capacitor 50 to pulse counter 48. Pulse counter 48 displays the total number of pulses received by it, and thus displays in convenient digital form a numerical value representing the amount of downward movement of scale 1.

Since the number displayed by the pulse counter 47 represents the total amount of upward movement of the scale 1, while the number displayed by pulse counter 48 represents the total amount of downward movement of scale 1, the difference between these two numbers represents the net change in the position of the scale. In other words, considering upward movement of scale 1 as a positive displacement or change in position, and downward movement as a negative displacement, the two pulse counters 47 and 48 together constitute pulse-counting means additively responsive to pulses supplied through capacitor 49 and subtractively response to pulses supplied through capacitor 50. Thus there is provided a position meter that continuously displays in convenient digital form numbers representing the instantaneous position of the scale.

Instead of using two pulse counters, a differential pulse counter may be used to indicate directly the difference value that represents the scale position. Various forms of differential pulse counters are known to those skilled in the art, one form being described in U.S. Patent No. 2,616,627, issued to W. H. T. Holden on November 4, 1952. In general, the differential pulse counter has two input terminals, and it is additively responsive to the pulses received at one terminal, and subtractively responsive to pulses received at the other terminal. For use in the present invention, one terminal of the differential pulse counter may be connected to capacitor 49, and the other input terminal of the differential pulse counter may be connected to capacitor 50.

As another alternative, the pulse counters 47 and 48 may be counting registers in digital computing or control apparatus for performing any desired computing or control functions, or both, that may be required. The pulse counters may be located at any desired distance from the other portions of the apparatus, and may, if desired, control conventional printing registers for making permanent records of the scale positions. If desired, the pulses supplied through capacitors 49 and 50 may be used directly to actuate control apparatus, or means associated with the pulse counters may supply control signals.

An important advantage of the present invention is that the accuracy of the position meter is not affected by changes in the speed or the direction of motion of the movable scale. For example, assume that the scale is moving upward. No matter how slowly the scale may move, as soon as thyratron 35 is fired at point 73 the electrical triggering action that extinguishes thyratron 34 and produces a pulse at the anode of triode 42 occurs very rapidly, and output pulses of substantially uniform amplitude and duration are reliably produced. Conversely, the scale may move very rapidly, since the trigger circuit can operate at very high speeds, the chief factor limiting the speed of operation being the short de-ionization time of the thyratrons.

The direction of motion of scale 1 may change at any point in the operating cycle, without producing inaccuracies in the position indication provided by the position meter. For example, assume that scale 1 is moving upward and that an operating cycle starts at point 69. Pentode 28 begins to conduct current, and thyratron 34 is fired at point 70. Now assume that the direction of motion reverses before point 73 is reached, and that the scale returns to the position represented by point 69. Since point 73 was not reached, thyratron 35 was not fired, and no output pulse was supplied to either pulse counter. At point 69 both pentodes and both thyratrons are cut off, and the circuit has returned to its initial state without any change of position indication.

Now assume that a cycle starts at point 69, and that scale 1 moves upward past point 73. At point 73 thyratron 35 fires, thyratron 34 is cut off, and a pulse is supplied to pulse counter 47. Now assume that the direction of motion reverses, and scale 1 moves downward. Unless point 77 is passed in the downward movement, there is no change in the circuit condition. Therefore, if the scale again moves upward and passes point 73 a second time without having passed point 77, there is no production of spurious pulses because thyratron 35 is already fired when point 73 is passed the second time. On the other hand, if the reverse motion goes beyond point 77, thyratron 34 is fired, thyratron 35 is cut off and a pulse is supplied to pulse counter 48, which in effect cancels the pulse previously supplied to counter 47 because position is indicated by the difference between the numbers displayed by the two pulse counters.

Bearing in mind the principle and considerations herein set forth, it will be apparent that changes in the speed or direction of motion of the scale at any point in an operating cycle, and occurring as often as may be desired either periodically or randomly, will never cause an incorrect position indication. Although the spacing between points 73 and 77 is, in a sense, a "back lash" error, this theoretical error is not of practical consequence because it is much smaller than the minimum distance that the apparatus is designed to measure, which is the spacing between adjacent grooves 3 on the scale.

In the apparatus shown in Fig. 1, the resolving power (that is, the smallest change in position can be measured) is limited by the minimum practicable spacing of grooves 3 in the scale. Although very closely spaced grooves can be ruled on a scale, as the groove spacing is made smaller and approaches a single wavelength of light, optical defraction reduces the efficiency of the optical system and ultimately, at extremely close spacings, makes the system inoperative. Furthermore, the counting speed of the electrical circuit is limited by the de-ionization time of thyratrons 34 and 35. Both of these disadvantages are overcome in the alternative embodiment illustrated in Fig. 6.

Figure 6:
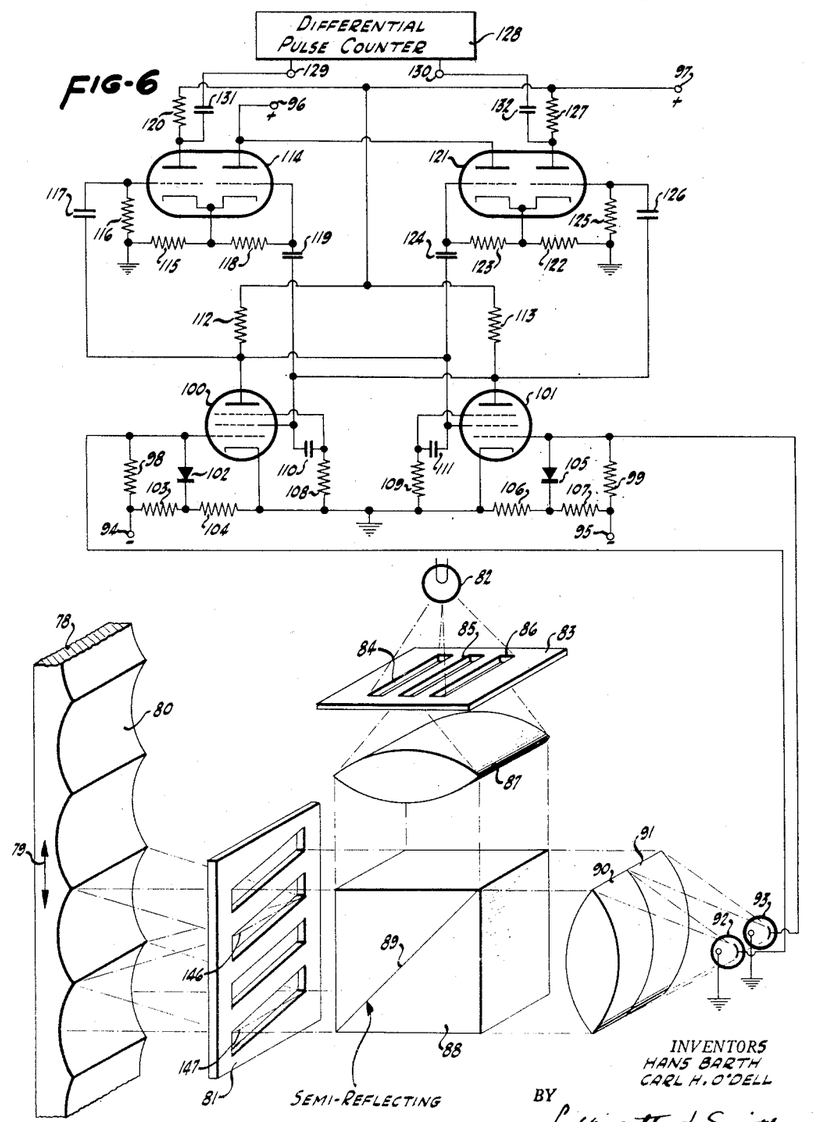
Fig. 6 is a schematic perspective view and circuit diagram illustrating another embodiment of the invention.

Referring now to Fig. 6 of the drawings, a movable scale 78 may move upward and downward, selectively, as is indicated by double-headed arrow 79. Cut in the surface of scale 78 there are a plurality of uniformly spaced parallel grooves 80 shaped as cylindrical segments and acting as small cylindrical mirrors for focusing light rays. Grooves 80, which extend substantially perpendicular to the direction of motion of the scale, may be cut with a tool having a substantially circular or parabolic cutting edge to form reflecting surfaces shaped as segments of cylinders having substantially circular or parabolic transverse sections. A reticule 81 is located substantially in the plane of the principal foci of mirrors 80. Reticule 81 has a plurality of parallel slit-like optical apertures, which may be much more closely spaced than the spacing of grooves 80. The apertures extend transversely across substantially the entire width of the reticule, as shown. For purposes hereinafter more fully explained, the apertures of reticule 81 are slightly slanted with respect to the focal lines of mirrors 80. In brief, the two side-by-side halves of recticule 81 serve as two reticules, and the slant of the apertures produces an effective aperture displacement, in a direction of scale motion, of one-half of the reticule relative to the other half of the reticule.

An optical system includes a lamp 82, an optical mask 83 containing parallel slit-like apertures 84, 85 and 86, a cylindrical lens 87, a beam-splitter prism 88 having a diagonal semi-reflecting interface 89, a pair of lenses 90 and 91, and two phototubes 92 and 93. Lamp 82 illuminates slits 84, 85, 86, and light passing through each slit is substantially collimated by lens 87 and directed onto the semi-reflecting interface 89 of beam-splitter prism 88. Interface 89 reflects a portion of the collimated light onto reticule 81, and some of this light passes through the apertures of the reticule to illuminate a portion of scale 78 including a plurality of the small cylindrical mirrors 80.

Mirrors 80 reflect and focus the collimated light into reflected light wedges (indicated by broken lines in the drawing) having apexes lying substantially in the plane of reticule 81. The wedge apexes form parallel bands of light that move with the scale when scale 78 moves. When the wedge apexes are aligned with apertures of the reticule, reflected light passes through the reticule to semi-reflecting interface 89, and a portion of this light is transmitted through the semi-reflecting interface to lenses 90 and 91. Lens 90 focuses light from one side half of the reticule onto the cathode of phototube 92, and lens 91 focuses light from the other side half of the reticule onto the cathode of phototube 93.

The electrical circuit includes terminals 94 and 95 that are maintained at a negative potential (minus 45 volts, for example), a terminal 96 that is maintained at a positive potential (plus 200 volts, for example), and a terminal 97 that is maintained at the positive potential (plus 400 volts, for example), by any suitable voltage supply apparatus (not shown). The cathode of phototube 92 is connected to terminal 94 through a resistor 98, and the cathode of phototube 93 is connected to terminal 95 through a resistor 99. The anodes of the two phototubes are connected to ground or its circuit equivalent.

Two pentode vacuum tubes 100 and 101 have their cathodes connected to ground or its equivalent, as shown. The control grid of tube 100 is connected to the cathode of phototube 92, and the control grid of tube 101 is connected to the cathode of phototube 93. A diode rectifier 102 is connected to a tap of a voltage divider 103—104 connected between terminal 94 and ground, and a rectifier 105 is connected between the control grid of tube 101 and a tap of a voltage divider 106—107 connected between terminal 95 and ground. Rectifiers 102 and 105 are poled to prevent the control grids of tubes 100 and 101 from becoming substantially more positive than the negative potential of the voltage divider taps. The suppressor grids of tubes 100 and 101 are connected to ground through resistors 108 and 109, respectively. Capacitors 110 and 111 are connected between the screen grids and the suppressor grids of the two pentodes, as shown. The screen grid of tube 100 is connected to the anode of tube 101, and the screen grid of tube 101 is connected to the anode of tube 100. The anodes of tubes 100 and 101 are connected to terminal 97 through load resistors 112 and 113.

A twin triode vacuum tube 114 has a common cathode connected to ground or its equivalent through a resistor 115. Its left side control grid is connected to ground through resistor 116 and is connected to the anode of tube 100 through capacitor 117. The right side control grid of tube 114 is connected to its cathode through resistor 118 and is connected to the anode of tube 101 through capacitor 119. The left side anode of tube 114 is connected to terminal 97 through resistor 120. The right side anode of tube 114 is connected to terminal 96.

A twin triode vacuum tube 121 has a common cathode connected to ground or its equivalent through resistor 122. The left side control grid of tube 121 is connected to its cathode through resistor 123, and is connected to the anode of tube 100 through capacitor 124. The right side control grid of tube 121 is connected to ground through resistor 125 and is connected to the anode of tube 101 through capacitor 126. The left side anode of tube 121 is connected to terminal 96, and the right side anode of tube 121 is connected to terminal 97 through resistor 127.

A differential pulse counter 128 is additively responsive to electric pulses received at terminal 129 and is subtractively responsive to electric pulses received at terminal 130. In other words, pulse counter 128 displays in digital form the numerical value of the difference between the total number of pulses received at terminal 129 and the total number of pulses received at terminal 130. Terminal 129 is connected to the left side anode of tube 114 through a capacitor 131, and terminal 130 is connected to the right side anode of tube 121 through a capacitor 132.

Figure 7:
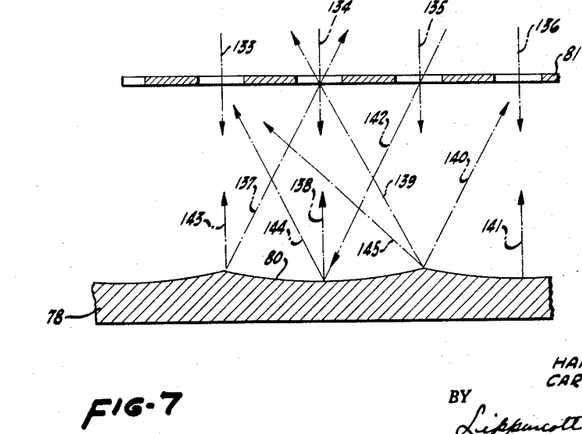
Fig. 7 is a schematic fragmentary detail section of the ruled scale and reticule of the Fig. 6 embodiment.

The optical principles of the scale and reticule shown in Fig. 6 can best be understood by reference to Fig. 7, which is an enlarged fragmentary section of the scale and reticule. Light passing through slit 85 (Fig. 6) is substantially collimated by lens 87 and is directed onto reticule 81 as a beam of substantially parallel rays, represented in Fig. 7 by vertical broken arrows 133, 134, 135, and 136. About half of the incident light passes through the optical apertures of the reticule and is reflected from the cylindrical mirrors 80 cut into the surface of scale 78. Mirrors 80 focus the light into wedges, as represented by broken arrows 137, 138, 139, 140 and 141, having apexes substantially in the plane of the reticule 81. When scale 78 moves in a lengthwise direction, the wedges of reflected light move with the scale, and the apexes of the wedges come into alinement with the apertures and the opaque portions of reticule 81 alternately.

When the apexes of the wedges are alined with the apertures of the reticule, reflected light passes through the apertures and is transmitted to phototubes 92 and 93. When the apexes of the wedges are alined with opaque portions of the reticule, the reflected light is substantially cut off and the amount of light reaching the phototubes is greatly reduced. Consequently, a complete cycle of light variation, from maximum light to minimum light and back to maximum light, occurs each time that scale 78 is moved through a distance equal to the spacing of the reticule apertures, which may be much smaller than the spacing of grooves 80 in the scale.

In general, the spacing of grooves 80 may be any integral multiple of the reticule aperture spacing. For example, the spacing of grooves 80 may be ten or more times as great as the spacing between adjacent apertures of reticule 81. In actual practice, reticule 81 may be a ruled grading having hundreds of small parallel slit-like optical apertures.

Light from slit 86 is also formed into a beam of substantially parallel light rays, but these rays are at a slight angle to the rays of light from slit 85. In Fig. 7, broken arrow 142 represents a typical light ray from slit 86. These rays are also focused into wedges by mirrors 80, as is indicated in Fig. 7 by broken arrows 143, 144 and 145, but the apexes of these wedges are displaced slightly from the apexes of the wedges formed by light from slit 85. Similarly, light from slit 84 is focused by mirrors 80 into wedges displaced in the other direction from the wedges produced by light from slit 85.

By providing a large number of apertures in mask 83, for example, by making this mask in the form of a ruled grading, a large number of optical wedges can be produced by each of the mirrors 80. The apexes of these wedges are displaced by amounts determined by the spacing of the apertures in the mask 83, and by proper choice of the aperture spacings the apexes of all the wedges can be made to fall upon apertures of reticule 81 simultaneously.

In other words, each of the mirrors 80 produces an optical image of mask 83 in the plane of reticule 81, and these images move with scale 78 whenever the scale moves in a lengthwise direction. When bright portions of the image coincide with the apertures in reticule 81, maximum light is transmitted to the phototubes, and when dark portions of the image coincide with the apertures of reticule 81, minimum light is transmitted to the phototubes. With this arrangement, the efficiency of the optical system is greatly increased over what it would be if mask 83 contained only the single slit 85.

For producing two light signals in position quadrature, two reticules displaced relative to each other may be used as was explained in connection with Fig. 1. Alternatively, a single reticule may be used as shown in Fig. 6, with the reticule apertures slightly slanted with respect to the focal lines of mirrors 80. In Fig. 6, broken lines 146 and 147 represent the apexes of two wedges of reflected light, which are parallel to the principal focal lines of mirrors 80. The apertures of reticule 81 are slanted so that the wedge apexes extend diagonally across the reticule apertures, as shown, whereby the apexes at one side of the reticule are just beginning to move into opaque areas of the reticule as the apexes at the other side of the reticule are just beginning to move into transparent areas. Since light from one side half of the reticule is focused on the cathode of phototube 92, while light from the other side half of the reticule is focused onto the cathode of phototube 93, the respective light signals received by the two phototubes are in position quadrature with respect to displacements of scale 78.

Figure 8:
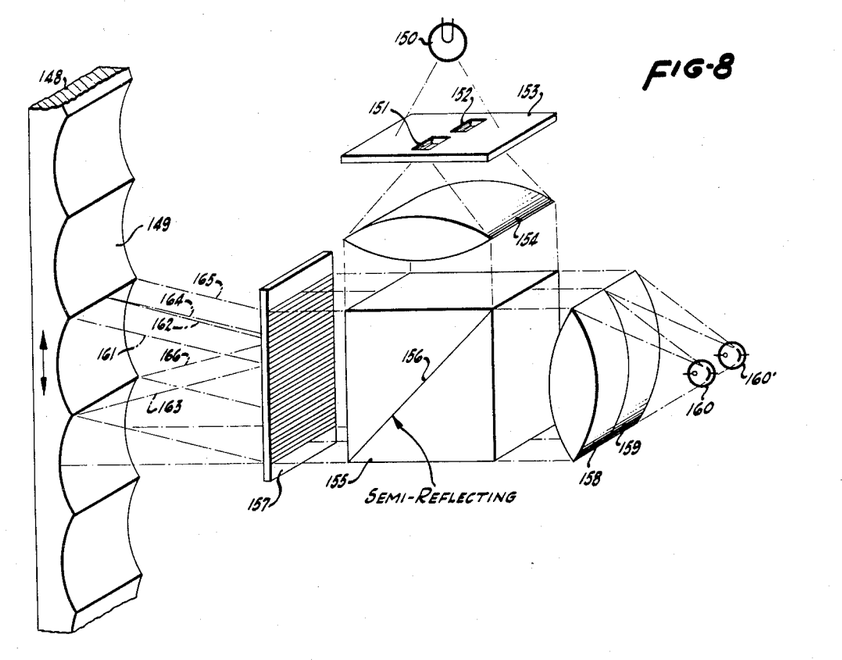
Fig. 8 is a schematic perspective view illustrating an alternative optical system.

An alternative optical system is illustrated in Fig. 8. Scale 148 has cut therein a plurality of uniformly spaced parallel light-reflecting grooves 149 having the shape of cylindrical segments and forming a plurality of small cylindrical mirrors. The optical system includes a lamp 150 that illuminates two slits 151 and 152 in an optical mask 153. Light from each slit is substantially collimated by a lens 154 and is directed to a beam-splitting prism 155 having a semi-reflecting diagonal interface 156 that reflects portions of the collimated light beams onto a reticule 157. Light from slit 151 illuminates one side half of the reticule, and light from slit 152 illuminates the other side half of the reticule. Reticule 157 may be an optical grating ruled with a plurality of parallel closely-spaced lines to form a large number of parallel slit-like optical apertures.

Light that passes through reticule 157 is reflected by mirrors 149 and focused into wedges of light having their apexes substantially in the plane of reticule 157. When the apexes of the light wedges fall on transparent portions of the reticule, reflected light passes through the reticule back into beam-splitting prism 155. A portion of the reflected light is transmitted through semi-reflecting interface 156, and is focused by lenses 158 and 159 onto the cathodes of two phototubes 160 and 160'. Light from one side half of reticule 157 is focused onto the cathode of phototube 160, and light from the other side half of reticule 157 is focused onto phototube 160'. The two phototubes may be connected in an electrical circuit similar to that shown in Fig. 1, or in an electrical circuit similar to that shown in Fig. 6.

In principle, the optical system shown in Fig. 8 is generally similar to that shown in Fig. 6, but in the Fig. 8 system the reticule apertures are parallel to the apexes of the light wedges. Position quadrature of the two signals is obtained by having slits 151 and 152 laterally displaced from each other, so that the collimated light rays passing through one side of reticule 157 travel in a slightly different direction from that of the collimated light rays passing through the other side of reticule 157.

As a result, the apex of the light wedge formed by one side of each mirror 149, represented in the drawing by broken lines 161, 162 and 163, is slightly displaced from the apex of the wedge of light formed by the other half of the same mirror 149 and represented in the drawing by broken lines 164, 165 and 166. This displacement is preferably equal to about one-quarter of the spacing between reticule apertures, so that one of the wedges is just beginning to move into a transparent portion of the reticule as the other of the wedges is just beginning to move into an opaque portion of the reticule. In other words, each mirror 149 forms two side-by-side light wedges having their respective apexes displaced from each other in a direction of scale motion by an amount substantially equal to one-fourth the spacing between centers of adjacent apertures of reticule 157. Consequently, the two light signals received by the two phototubes 160 and 160' are substantially in position quadrature with respect to vertical displacements of scale 148.

Figure 9:
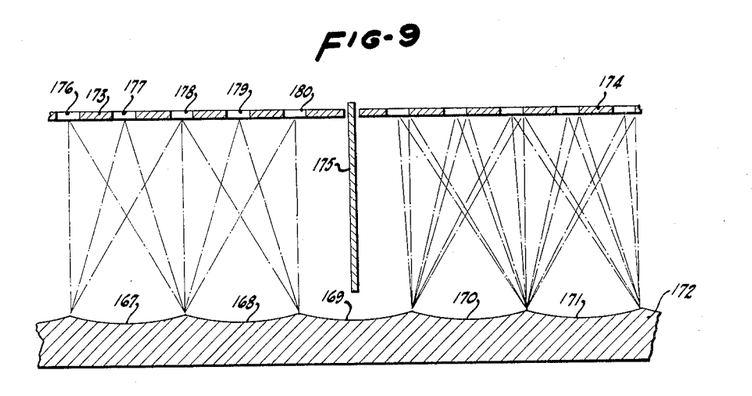
Fig. 9 is a schematic fragmentary detail section of a ruled scale and reticule, showing an alternative construction.

Another alternative optical system is illustrated in part in Fig. 9. A plurality of parallel grooves 167, 168, 169, 170 and 171, each having substantially the shape of a cylindrical segment, are cut into the surface of a movable scale 172. These grooves, which preferably are identical and spaced at equal distances along the length of the scale, have reflecting surfaces that act as small cylindrical mirrors. Two reticules 173 and 174 are spaced from scale 172 a distance such that the mirrors 167—171 focus images of the reticules upon themselves. The two reticules may be arranged end-to-end as shown, or they may be arranged side-by-side in the manner illustrated in Fig. 1. A mask 175 may be placed between the two reticules to prevent optical interaction. For example, mask 175 prevents mirror 169 from focusing an image of reticule 173 on reticule 174, and vice versa. Reticules 173 and 174 may be incorporated in an optical system or systems similar in principle to the optical systems hereinbefore described, so that light reflected back through the apertures of reticule 173 illuminates the cathode of one phototube while light reflected back through the apertures of reticule 174 illuminates the cathode of another phototube. The two phototubes are connected in an electrical circuit similar to the circuit shown in Fig. 1 or similar to the circuit shown in Fig. 6.

The tops of the two reticules are illuminated by light from any suitable source, but in this embodiment of the invention it is not essential that the light be collimated. In fact, in this embodiment the reticule apertures may be so small and so closely spaced that optical diffraction produces considerable scattering of the light passing through the reticule apertures. This is of no consequence since each aperture is only required to act as a light source for the mirrors 167—171.

The spacing of mirrors 167—171 is generally much greater than the spacing of the reticule apertures, and in general may be any integral multiple of the aperture spacing. For example, the spacing between successive mirrors may be 100 or more times greater than the spacing between successive reticule apertures. Consequently, even though the aperture spacing may be in the order of a wavelength of light, the width of each mirror is many wavelengths of light, and optical diffraction is not a substantial problem in connection with mirrors.

Assume that mirror 167 is exactly centered under aperture 177. Mirror 167 then focuses an image of aperture 177 upon itself, and light passing through aperture 177 to mirror 167 is reflected back through aperture 177. Furthermore, mirror 167 focuses an image of aperture 176 upon aperture 178, and also focuses an image of aperture 178 upon aperture 176. In other words, light passing through aperture 176 is reflected by mirror 167 back through aperture 178, and light passing through aperture 178 is reflected by mirror 167 back through aperture 176, and vice versa.

In a similar manner, mirror 168 focuses an image of aperture 179 back upon itself, focuses an image of aperture 178 upon aperture 180 and focuses an image of aperture 180 upon aperture 178. Thus, in this position of scale 172, a maximum amount of light is reflected from the mirrors of scale 172 back through the optical apertures of reticule 173. The reflected light may be focused onto the cathode of a phototube in the manner hereinbefore explained.

Now assume that scale 172 is moved toward the left. As mirrors 167 and 168 move toward the left, the images formed by these mirrors move in the same direction at twice the speed. When scale 172 has moved through a distance equal to one-quarter the reticule aperture spacing, the aperture images will have moved by a distance equal to one-half the reticule aperture spacing, and the images of apertures 176—180 will fall upon opaque portions of reticule 173. A minimum amount of reflected light will then pass through the reticule. When the scale has moved by a distance equal to one-half the reticule aperture spacing, the images of the apertures will have moved by a distance equal to the distance of the aperture spacing, and a maximum amount of reflected light will once again pass through the reticule. Consequently, with the same aperture spacing the optical system illustrated in Fig. 9 has twice the resolving power of the optical systems hereinbefore described.

For providing two light signals in position quadrature, reticule 174 is displaced from reticule 173 in relation to the axes of mirrors 167—171 by an amount equal to substantially one-eighth the reticule aperture spacing, so that when maximum reflected light passes through reticule 173, the amount of reflected light passing through reticule 174 is about the average of the maximum and minimum values. In other words, reticule 174 is so positioned that the aperture centers are focused on the aperture edges, as is indicated in the drawing by broken lines representing typical light rays, at the same time that the apertures of reticule 173 are exactly focused upon themselves. Reflected light passing through the apertures of reticule 174 is focused onto the cathode of a second phototube, so that the two phototubes provide two electric signals in position quadrature with respect to the position of scale 172.

Figure 10:
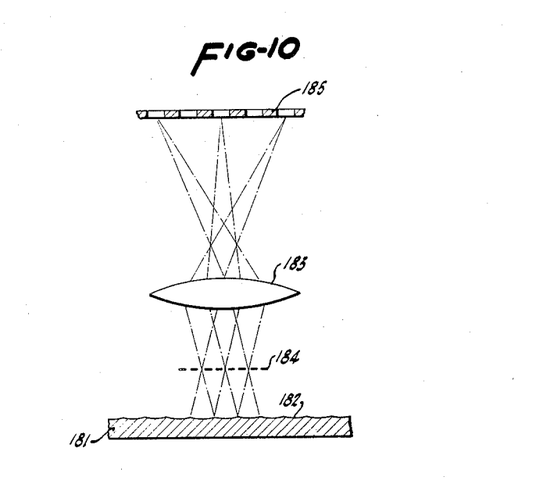
Fig. 10 is a schematic fragmentary detail section of a ruled scale and reticule, showing still another alternative construction.

Still another alternative optical system is illustrated in Fig. 10. In principle, the system shown in Fig. 10 is similar to that shown in Fig. 9 but each reticule is replaced by a reduced optical image of a much larger reticule structure. Referring to Fig. 10, scale 181, which may be similar to scale 172 of Fig. 9, has a plurality of cylindrical mirrors 182 machined into its surface. A lens 183 forms a reduced optical image at 184 of a relatively large reticule 185. Light passing through the apertures of reticule 185 is focused to fine lines in image 184 and these fine lines act as light sources with respect to the mirrors 182 of scale 181. Mirrors 182 form images of these lines in the same plane as image 184. Lens 183 then forms images of the images in the plane of reticule 185.

Whenever scale 181 moves through a distance equal to one-half the spacing between the lines of image 184, the reflected image in the plane of reticule 185 moves through a distance equal to the aperture spacing of reticule 185. Consequently, the resolution of this optical system is determined by the spacing of the lines in image 184, which may be much smaller than the spacing of the apertures in the reticule structure 185. For producing two signals in position quadrature, two side-by-side or end-to-end reticule structures with relatively displaced apertures may be provided at 185, or a single reticule structure with slanting apertures may be used in accordance with the principles described in connection with Fig. 6, or two separate optical systems of the type shown in Fig. 10 may be used to provide two light signals in position quadrature. The light supply, beam-splitter, and phototube portions of the optical system for Fig. 10 may be similar to any of those described in connection with the preceding figures. Two phototubes, or other transducers, convert the two light signals into two electric signals in position quadrature that control an electric circuit similar to the circuit shown in Fig. 1 or the circuit shown in Fig. 6.

Figure 11:
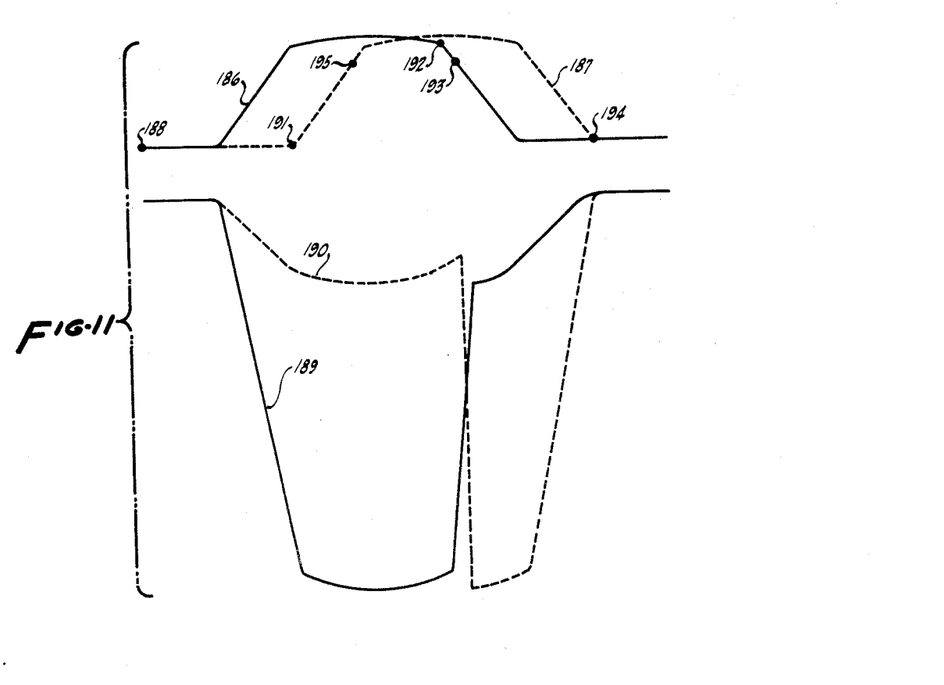
Fig. 11 is a group of curves that will be used in explaining the operation of the apparatus illustrated in Fig. 6.

Operation of the electrical circuit illustrated in Fig. 6 can best be understood with reference to the curves shown in Fig. 11. The effective electric signals applied to the control grid of tubes 100 and 101 by phototubes 92 and 93 during one operating cycle are represented by solid curve 186 and broken curve 187, respectively. Positive peaks of the electric signals are clipped by diode rectifiers 102 and 105, and negative peaks are clipped in effect by cutoff of tubes 100 and 101. As a result, curves 186 and 187 have substantially rectangular or trapezoidal waveforms. If desired, amplifiers may be inserted in the circuits between the phototubes and tubes 100 and 101 for further amplification and clipping of the signals to provide more nearly rectangular waveforms. Although good rectangular waveforms are not absolutely essential, they improve the reliability of circuit operation.

Curves 186 and 187 are position functions having instantaneous amplitudes determined by the position of the scale 78. When scale 78 moves continuously in one direction, then curves 186 and 187 represent time functions. When scale 78 moves in one direction, upward for example, positive time increments are represented by the left-to-right horizontal direction in Fig. 11; and when scale 78 moves in the opposite direction, downward, for example, positive time increments are represented by the right-to-left horizontal direction in Fig. 11

Assume that an operating cycle starts at point 188 of Fig. 11. At this point both of the tubes 100 and 101 are cut off by negative voltages applied to their control grids. As scale 78 moves upward, the amount of light reaching phototube 92 increases, the electrical resistance of this phototube decreases, and the grid potential of tube 100 becomes less negative, as is indicated by the rising portion of the curve 186. As its control grid potential rises, tube 100 conducts current, and its anode potential decreases because of the voltage drop across resistor 112, as is indicated by solid curve 189. The anode potential of tube 101, represented by broken curve 190, also drops somewhat, but by a much smaller amount, because of current flowing through resistor 113 to the screen grid of tube 100. Tube 101 remains cut off at this time.

At point 191 the control grid potential of tube 101 begins to change in the positive direction, as is indicated by the rise in curve 187. But the screen grid of tube 101 is connected to the anode of tube 100, and the low screen potential of tube 101 raises the cut-off point of the tube so that tube 101 cannot be conductive while tube 100 is conductive. At point 192 the control grid potential of tube 100 begins to become more negative, and as tube 100 conducts less current, its anode potential rises. As the anode potential of tube 100 rises, the screen grid potential of tube 101 likewise rises. At point 193 the screen grid potential of tube 101 has risen sufficiently for tube 101 to begin conducting current, the control grid potential of tube 101 then being near its maximum positive value, as is shown by curve 187.

As tube 101 begins to conduct current, its anode potential drops, and along with it the screen grid potential of tube 100 also drops. This further decreases the amount of current conducted by tube 100, causes a further rise in the anode potential of tube 100 and the screen grid potential of tube 101, and further increases the conduction of tube 101. This cumulative process continues very rapidly until tube 101 is conducting maximum current and tube 100 is completely cut off. In other words a rapid trigger action occurs at point 193, and the conduction of current is switched suddenly from tube 100 to tube 101.

Tube 101 continues to conduct current until point 194 is reached, at which point both of the tubes 100 and 101 are cut off by large negative potentials at their control grids, and the circuit is returned to its initial state with both of the tubes 100 and 101 cut off.

When scale 7 moves in the opposite direction, a cycle of operation starts at point 194 and ends at point 188. Tube 101 becomes conductive first, and remains conductive with tube 100 cut off until point 195 is reached, at which point a rapid trigger action occurs that transfers the conduction of current from tube 101 to tube 100.

The twin triode 114 is so arranged that its right side section is normally conductive while its left side section is normally non-conductive. This is accomplished by connecting grid leak resistor 118 to the common cathode of the tube so that the right side control grid is normally at a potential near cathode potential, and the right side section of the tube is highly conductive. Current flowing through cathode resistor 115 applies a fairly large negative bias to the left side control grid of tube 114, so that the left side of the tube is biased substantially below cut off. Resistor 115 is made sufficiently large that the left side of tube 114 remains cut off until a positive pulse is applied to the left side control grid through capacitor 117 and a positive pulse is simultaneously applied to the right side control grid through capacitor 119.

Such simultaneous pulses are provided when trigger action occurs at point 193 and the anode potential of tube 100 rises suddenly at the same time that the anode potential of tube 101 drops suddenly. The left side section of tube 114 then conducts a momentary pulse of current and an electric pulse is supplied through capacitor 131 and terminal 129 to the additive input terminal 129 of differential pulse counter 128. Consequently, as scale 78 is moved upward, an electric pulse is supplied to the additive input terminal of the differential pulse counter during each operating cycle of the trigger circuit.

When scale 78 moves downward, the trigger action supplies positive pulses to the right side control grid of tube 114 and supplies negative pulses to the left side control grid of tube 114. Consequently, during downward movement of scale 78 the left side section of tube 114 remains cut off at all times.

Twin triode 121 is connected in a circuit similar to that of twin triode 114, so that the left side section of tube 121 is normally conductive, and the right side section of the tube 121 is normally cut off. When scale 78 moves downward, triggering of the circuit containing tubes 100 and 101 occurs at point 195, and a positive pulse is supplied through capacitor 126 to the right side control grid of tube 121 at the same time that a negative pulse is supplied through capacitor 124 to the left side control grid of tube 121. Consequently, during downward movement of scale 78, an electric pulse is supplied during each operating cycle of the trigger circuit through capacitor 132 and terminal 130 to the subtractive input terminal of differential pulse counter 128.

Pulse counter 128 displays the numerical value of the difference between the number of pulses supplied to terminal 129 and the number of pulses supplied to terminal 130, and this difference value is proportional to the net displacement of scale 78 from its initial position. Since the trigger circuit shown in Fig. 6 contains hard vacuum tubes only, with no thyratrons or other gas tubes, there are no de-ionization times to limit the operating speed, and extremely high-speed operation can be achieved.

Although the circuits shown in Figs. 1 and 6 differ considerably in their circuit details, it will be noted that they have much in common in respect to their basic operating principles. In each embodiment there is a trigger circuit having three operating states. For example, in the Fig. 1 circuit one operating state exists when thyratron 34 is conductive, another operating state exists when thyratron 35 is conductive, and still another operating state exists when both thyratrons are cut off. In the Fig. 6 circuit, one operating state exists when tube 100 is conductive, another operating state exists when tube 101 is conductive, and a third operating state exists when both tubes are cut off. In both embodiments the trigger circuit is repetitively switched through each of the three operating states in sequence as the movable scale moves continuously in either direction, and the operating sequence reverses automatically whenever the direction of motion of the scale reverses.

In each case, the basic trigger circuit comprises two tubes, interconnected so that either or neither, but not both, may be conductive at any given time. For example, the conductive condition of each tube may be called "condition A," and the non-conductive condition may be called "condition B," or vice versa. The three operating states of the trigger circuit may then be designated "state AB," "state BA" and "state BB," representing the three possible combinations of conductive and non-conductive conditions of the two tubes in the trigger circuit. When the movable scale moves in one direction, the trigger circuit repetitively passes through the three states in the sequence AB, BA, BB. When the movable scale moves in the opposite direction, the sequence is BB, BA, AB.

Furthermore, each operating state occurs at definite scale positions, and this fact provides means for measuring subdivisions of the unit increments of displacement indicated by the pulse counters. In the Fig. 1 circuit, the operating state can be observed by noting the glow produced by the thyratrons when they are conducting. In the Fig. 6 circuit, similar indications may be produced by connecting small glow lamps in series with resistors 112 and 113.

In addition to the three principal operating states, two subsidiary operating states may be recognized. As hereinbefore explained, there is a small spacing or backlash between the triggering positions during upward scale movement and the triggering positions during downward scale movement. Between these points, both tubes are potentially conductive, but the circuit interconnections delay the triggering of the non-conductive tube to the conductive condition so long as the other tube is conductive. Therefore, in these positions the trigger circuit may operate either in state AB or in state BA, depending on the direction of scale motion. These two subsidiary states may be designated AB' and B'A. Their existence increases the reliability of the trigger circuit, and insures against the production of spurious pulses when the direction of scale motion reverses near the triggering points.

An electric pulse is supplied to the additive input terminal of the pulse-counting apparatus only at each time that the trigger circuit passes directly from a first to a second of the three states (from state AB to state BA, for example), and a pulse is supplied to the subtractive input terminal of the pulse-counting apparatus only at each time that the trigger circuit passes directly from the second to the first of the three states (from state BA to state AB, for example).

For example, in the Fig. 1 circuit an electric pulse is supplied to pulse counter 47 only when the trigger circuit passes directly from the state in which thyratron 34 conducts (state AB) to the state in which thyratron 35 conducts (state BA), and an electric pulse is supplied to pulse counter 48 only when the trigger circuit passes directly from the state in which thyratron 35 conducts (state BA) to the state in which thyratron 34 conducts (state AB). No pulse is supplied to either pulse counter as the trigger circuit passes through the third state in which neither thyratron is conducting (state BB).

In the Fig. 6 circuit, an electric pulse is supplied to terminal 129 only when the trigger circuit passes directly from the state in which tube 100 conducts (state AB) to the state in which tube 101 conducts (state BA), and an electric pulse is provided at terminal 130 only when the trigger circuit passes directly from the state in which tube 101 conducts (state BA) to the state in which tube 100 conducts (state AB). No electric pulse is supplied to either input terminal of the pulse counter when the trigger circuit passes through the third state in which neither of the tubes 100 and 101 is conductive (state BB).

It should be understood that this invention in its broader aspects is not limited to specific embodiments herein illustrated and described, and that the following claims are intended to cover all changes and modifications that do not depart from the true spirit and scope of the invention.

What is claimed is:

1. A position meter comprising a movable scale, means providing two electric signals having instantaneous amplitudes that are repeating functions of the position of said scale, said signals being substantially in position quadrature, two vacuum tubes each having an anode and a control grid and a cathode, means for supplying said two electric signals to respective ones of said two control grids so that each of said vacuum tubes becomes conductive and non-conductive alternately as said scale moves, said vacuum tubes becoming conductive and non-conductive at different times in a sequence that depends upon the direction of scale motion, two thyratrons each having an anode and a control electrode and a cathode, the cathodes of said thyratrons being connected together and the control electrodes of said thyratrons being connected to the anodes of respective ones of said vacuum tubes, two resistors connected between the cathodes of said thyratrons and the anodes of respective ones of said vacuum tubes, a terminal, means for providing a positive voltage between said terminal and the cathodes of said vacuum tubes, two resistors connected between said terminal and the anodes of respective ones of said thyratrons, a capacitor connected between the anodes of said thyratrons, whereby either or neither but not both of said thyratrons may conduct steady-state current at a given time to provide a trigger circuit having three operating states, means providing an electric pulse of a first pulse plurality only at each time that a first one of said thyratrons becomes conductive and a second one of said thyratrons substantially simultaneously becomes non-conductive, means providing an electric pulse of a second pulse plurality only at each time that said second thyratron becomes conductive and said first thyratron simultaneously becomes non-conductive, and pulse-counting means additively responsive to pulses of said first plurality and subtractively responsive to pulses of said second plurality.

2. A position meter as defined in claim 1, in which said vacuum tubes are pentodes.

3. A position meter comprising a movable scale, means providing two electric signals having instantaneous amplitudes that are repeating functions of the position of said scale, said signals being substantially in position quadrature, first and second vacuum tubes each having an anode and a control grid and a cathode, means supplying said two electric signals to the control grids of respective ones of said first and second vacuum tubes so that each of said first and second vacuum tubes becomes conductive and non-conductive alternately as said scale moves, said first and second vacuum tubes becoming conductive and non-conductive at different times and in a sequence depending upon the direction of motion of said scale, first and second thyratrons each having an anode and a control electrode and a cathode, the cathodes of said thyratrons being connected together, the control electrode of said first thyratron being connected to the anode of said second vacuum tube and the control electrode of said second thyratron being connected to the anode of said first vacuum tube, two resistors connected between the cathodes of said thyratrons and the anodes of said first and second vacuum tubes respectively, a terminal, means for supplying a positive voltage between said terminal and the cathodes of said first and second vacuum tubes, two resistors connected between said terminal and the anodes of said first and second thyratrons respectively, a capacitor connected between the anodes of said thyratrons, third and fourth vacuum tubes each having an anode and a control grid and a cathode, the cathode of said third vacuum tube being connected to the anode of said first thyratron and the cathode of said fourth vacuum tube being connected to the anode of said second thyratron, the control grids of said third and fourth vacuum tubes being connected to the cathodes of said thyratrons, two resistors connected between said terminal and the anodes of said third and fourth vacuum tubes respectively, whereby electric pulses are produced at the anode of said third vacuum tube only when said scale moves in one direction and electric pulses are produced at the anode of said fourth vacuum tube only when said scale moves in the opposite direction, and pulse-counting means additively responsive to the electric pulses produced at the anode of said third vacuum tube and subtractively responsive to the electric pulses produced at the anode of said fourth vacuum tube.

4. A position meter comprising a movable scale, means providing two electric signals having instantaneous amplitudes that are repeating functions of the position of said scale, said signals being substantially in position quadrature, first and second pentode vacuum tubes each having an anode, a suppressor grid, a screen grid, control grid, and a cathode, said cathodes being connected together, a terminal, means for providing a positive voltage between said terminal and said cathodes, two resistors connected between said terminal and respective ones of said two anodes, a resistor connected between the suppressor grid and the cathode of said first vacuum tube, a resistor connected between the suppressor grid and the cathode of said second vacuum tube, a capacitor connected between the suppressor grid and the screen grid of said first vacuum tube, a capacitor connected between the suppressor grid and the screen grid of said second vacuum tube, the screen grid of said first vacuum tube being connected to the anode of said second vacuum tube, the screen grid of said second vacuum tube being connected to the anode of said first vacuum tube, a source of negative bias potential, two resistors connected between said source of bias potential and respective ones of said control grids, two rectifiers connected to respective ones of said control grids and poled to limit the positive peaks of signals supplied thereto, means for supplying said two electric signals to respective ones of said control grids so that each of said vacuum tubes is biased to conductive and non-conductive conditions alternately as said scale moves, the connections between the screen grids and anodes of said tubes substantially preventing the conduction of current by both tubes at the same time, whereby there is provided a trigger circuit having three operating states that is switched through said three states in sequence as said scale moves, the sequence depending upon the direction of motion of said scale, means providing an electric pulse of a first pulse plurality only at each time that said first tube becomes conductive and said second tube substantially simultaneously becomes non-conductive, means providing an electric pulse of a second pulse plurality only at each time that said second tube becomes conductive and said first tube substantially simultaneously becomes non-conductive, and pulse-counting means additively responsive to pulses of said first plurality and subtractively responsive to pulses of said second plurality.

5. A position meter comprising a movable scale, first and second electrical switching devices each having substantially conductive and substantially non-conductive selective operating conditions, means for switching each of said devices at different times to the substantially conductive condition and the substantially non-conductive condition alternately as repeating functions of scale position as said scale moves, means interconnecting said first and second devices to delay the switching of either to the substantially conductive condition so long as the other is substantially conductive, each of said devices having an output terminal supplying a positive electric pulse when the device is switched to the substantially non-conductive condition and supplying a negative electric pulse when the device is switched to the substantially conductive condition, first, second, third, and fourth vacuum tube sections each containing an anode and a control grid and a cathode, the cathodes of said first and second sections being connected together and being connected to ground through a first cathode resistor, the cathodes of said third and fourth sections being connected together and being connected to ground through a second cathode resistor, the control grid of said first section being connected to ground through a grid leak resistor, the control grid of said second section being connected to the cathode of said second section through another grid leak resistor, the control grid of said third section being connected to the cathode of said third section through another grid leak resistor, the control grid of said third section being connected to the cathode of said third section through another grid leak resistor, the control grid of said fourth section being connected to ground through another grid leak resistor, means supplying positive electric potentials to said four anodes, whereby said second and third sections are normally substantially conductive and said first and fourth sections are normally substantially non-conductive, capacitors connecting the control grids of said first and third sections to the output terminal of said first switching device, capacitors connecting the control grids of said second and fourth sections to the output terminal of said second switching device, whereby an electric pulse is provided at the anode of said first section only at each time that said first switching device becomes substantially non-conductive and said second switching device simultaneously becomes substantially conductive, and an electric pulse is provided at the anode of said fourth section only at each time that said first switching device becomes substantially conductive and said second switching device simultaneously becomes substantially non-conductive, and pulse-counting means additively responsive to electric pulses produced at the anode of said first setcion and subtractively responsive to electric pulses produced at the anode of said fourth section.

References Cited in the file of this patent

UNITED STATES PATENTS

| | | |
|---|---|---|
| 1,721,375 | De Koning | July 16, 1929 |
| 2,537,427 | Seid et al. | Jan. 9, 1951 |
| 2,656,106 | Stabler | Oct. 20, 1953 |
| 2,685,082 | Beman | July 27, 1954 |
| 2,685,083 | Beman | July 27, 1954 |
| 2,733,430 | Steele | Jan. 31, 1956 |
| 2,734,188 | Jacobs | Feb. 7, 1956 |
| 2,788,519 | Caldwell | Apr. 9, 1957 |
| 2,796,598 | Cartwright | June 18, 1957 |
| 2,857,802 | Cail | Oct. 28, 1958 |
| 2,886,717 | Williamson et al. | May 12, 1959 |